June 4, 1935. J. M. POWELL Re. 19,602

COMBINATION GRAVE MARKER AND FLOWER VASE

Original Filed Dec. 7, 1933 2 Sheets-Sheet 1

Inventor
John M. Powell
By Paulmin & Paulmin
Attys

June 4, 1935. J. M. POWELL Re. 19,602

COMBINATION GRAVE MARKER AND FLOWER VASE

Original Filed Dec. 7, 1933 2 Sheets-Sheet 2

Inventor
John M. Powell
By Taulmin & Taulmin
Attys

Reissued June 4, 1935

Re. 19,602

UNITED STATES PATENT OFFICE 19,602

COMBINATION GRAVE MARKER AND FLOWER VASE

John M. Powell, Mount Vernon, Ill.

Original No. 1,963,804, dated June 19, 1934, Serial No. 701,367, December 7, 1933. Application for reissue December 24, 1934, Serial No. 759,118

8 Claims. (Cl. 47—41)

The present invention relates to a combination grave marker and flower vase and the object of the invention resides in the provision of a grave marker in which is incorporated a flower vase which may be raised when it is desired to use the same or which may be lowered out of sight when not in use.

Another important object of the invention resides in the provision of a device of this nature which is simple in its construction, compact and convenient in its arrangement of parts, inexpensive to manufacture, strong and durable, easy to manipulate, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 3 is a sectional view taken substantially on the line 3—3 of Figure 1.

Figure 1:
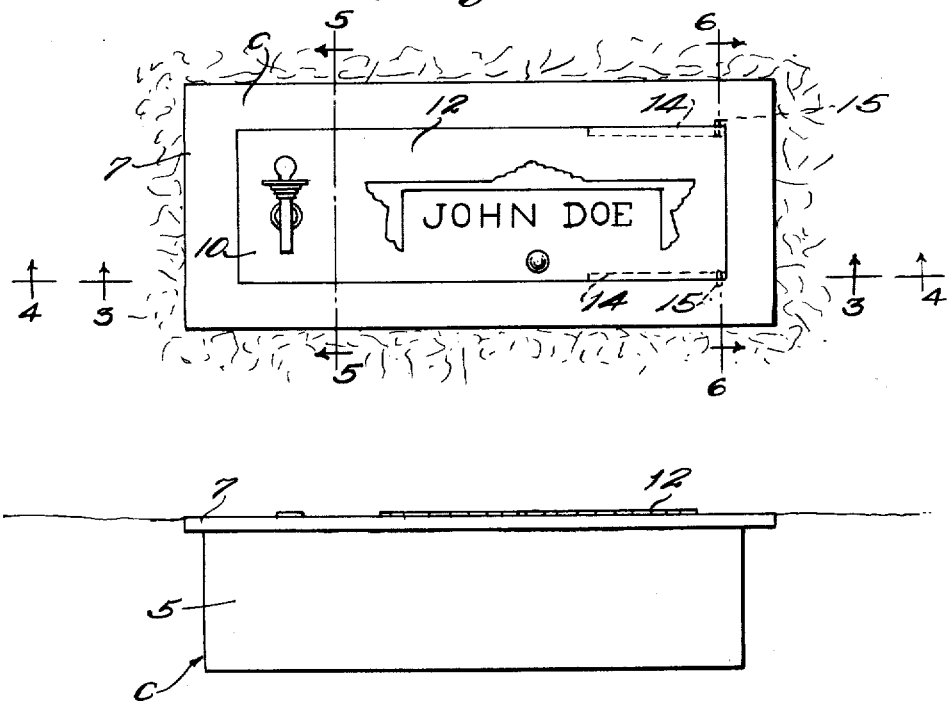
Figure 1 is a top plan view of the device showing the same closed.
Figure 2:
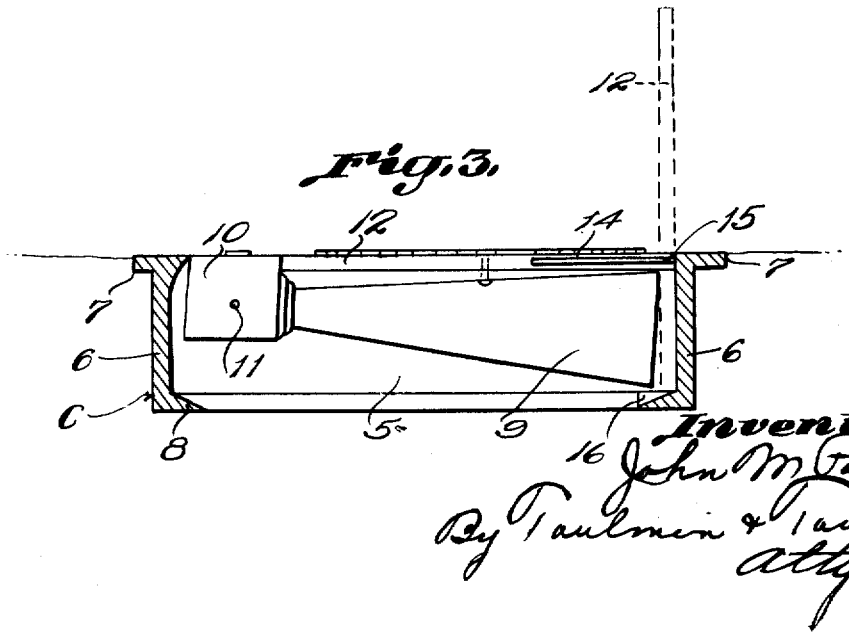
Figure 2 is a side elevation thereof.
Figure 4:
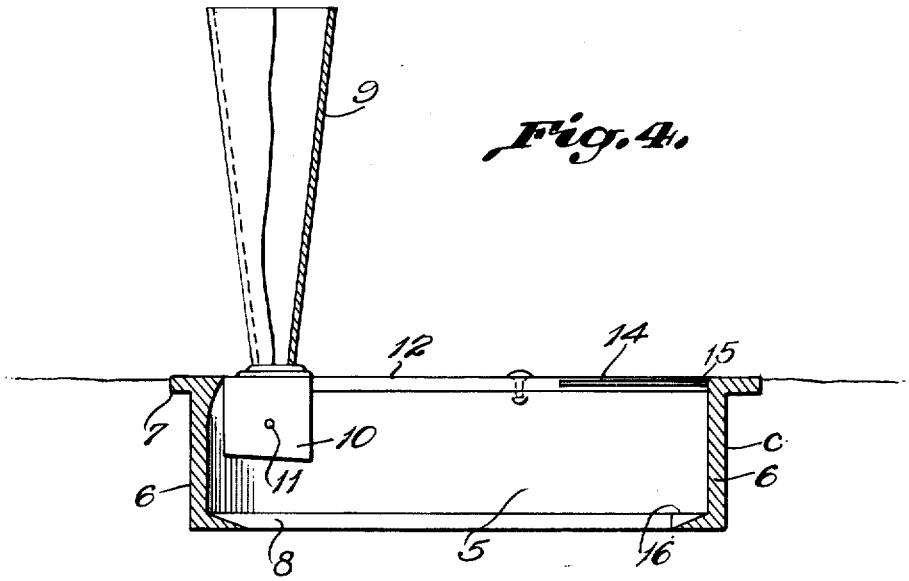
Figure 4 is a sectional view taken substantially on the line 4—4 of Figure 1 but showing the vase in raised position and partly in section.
Figure 5:
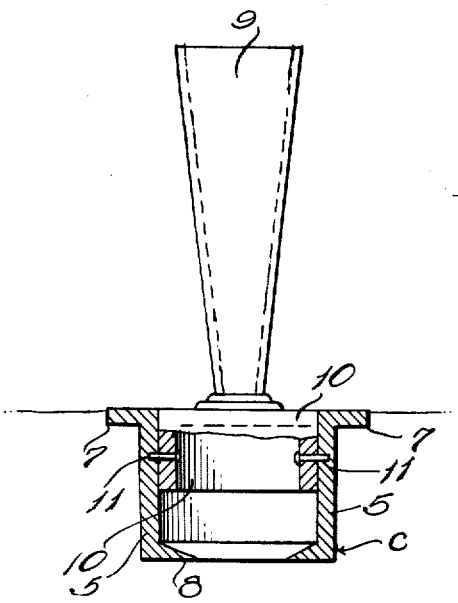
Figure 5 is a vertical transverse section taken substantially on the line 5—5 of Figure 1 but showing the vase in raised position.
Figure 6:
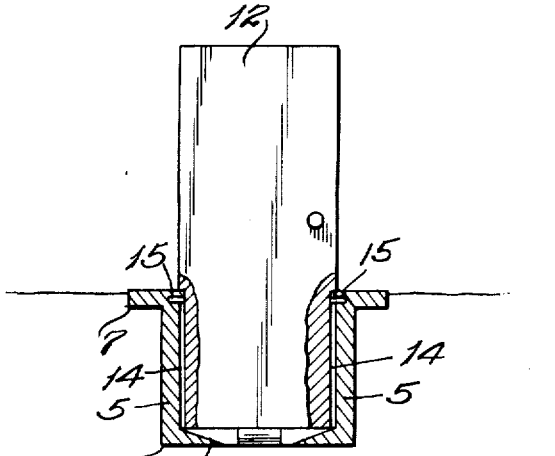
Figure 6 is a vertical transverse section taken substantially on the line 6—6 of Figure 1 but showing the cover in raised position.

Referring to the drawings in detail it will be seen that the letter C denotes generally a casing comprising side walls 5—5 and end walls 6—6. An outwardly directed ledge 7 is provided about the upper edge of the casing. An inwardly directed flange 8 is provided on the lower edge of the casing and is beveled as shown to advantage in Figures 3 to 6 inclusive.

Numeral 9 denotes a vase on a hollow block-like base structure, 10 in the sides of which are pins 11 rockable in the sides 5 adjacent one end 6. Numeral 12 denotes a cover having on its side edges at one end remote from the vase longitudinally extending grooves 14 into which extend pins 15 projecting inwardly from the sides 5 adjacent the other end wall 6 so that the cover may be swung upwardly and outwardly with respect to the casing and then lowered to abut the rest 16. The vase when in lowered position is adapted to abut the rest 16 and when in this position permits any water in the vase to readily drain out. It will be noted that the base 10 has the side wall which is uppermost when the vase is in down position as shown in Figure 1 of such a size as to fill the space between one end of the cover and said one end wall 6. This side of the vase may be decorated as indicated in Figure 1 as may also be the top or outer surface of the cover. It will be noted that the bottom of the casing is open and provides for ready drainage and any contraction or expansion according to weather conditions.

It will be observed that the cover and vase device are adapted to close the casing when the vase is in either of its positions. When the cover is closed and the vase is standing up, the base of the vase will coact with the cover and complete the closing of the casing and similarly when the cover is closed and the vase is down within the casing, the base of the vase will then also coact with the cover and complete the closing of the casing.

It is thought that the construction, operation, utility and advantages of this invention will now be clearly apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a device of the class described, a casing, a cover equal in size to the area of the major portion of the top of the casing, means for mounting one end of the cover in one end of the casing so that it may be opened and closed, a vase, a base for the vase, means for rockably mounting the base in the other end of the casing, said base having faces of a size substantially equal to the space left open by the cover when in closed position to close said space whether the vase is in raised or lowered position.

2. In a device of the class described, a casing, a cover equal in size to the area of the major portion of the top of the casing, means for mounting one end of the cover in one end of the casing so that it may be opened and closed, a vase, a base for the vase, means for rockably mounting the base in the other end of the casing, said base having faces of a size substantially equal to the space left open by the cover when in closed position to close said space whether the vase is in raised or lowered position, said first mentioned means comprising pins projecting inwardly from the sides of the casing and extending into longitudinal grooves provided on the side edges of the cover.

3. In a device of the class described, a casing, a cover equal in size to the area of the major portion of the top of the casing, means for mounting one end of the cover in one end of the casing so that it may be opened and closed, a vase, a base for the vase, means for rockably mounting the base in the other end of the casing, said base having faces of a size substantially equal to the space left open by the cover when in closed position to close said space whether the vase is in raised or lowered position, said first mentioned means comprising pins projecting inwardly from the sides of the casing and extending into longitudinal grooves provided on the side edges of the cover, a rest in the casing for the cover when in open position and for the vase when in lowered position.

4. In a device of the class described, the combination with a casing, of a cover and a hinged vase, the latter adapted to swing into and out of the casing when the cover is in open position.

5. In a device of the class described, the combination with a casing, of a lid and a hinged vase, both acting to close the casing when the lid is in its down position and the vase is in either its down or standing position.

6. In a device of the class described, the combination with a casing, of a cover hinged thereto, and a vase hinged thereto.

7. In a device of the class described, the combination with a casing, of a cover hinged thereto, and a vase hinged thereto, the cover and vase device being adapted to close the casing when the vase is in either of its positions.

8. In a device of the class described, the combination with a casing, of a vase, pivotally mounted in the casing and adapted to close that part of the casing which it occupies, when the vase is in either of its positions.

JOHN M. POWELL.